United States Patent [19]

Bullivant

[11] Patent Number: 4,512,428
[45] Date of Patent: Apr. 23, 1985

[54] WEIGHING APPARATUS AND METHOD

[75] Inventor: Kenneth W. Bullivant, Scottsdale, Ariz.

[73] Assignee: K-Tron International, Inc., Scottsdale, Ariz.

[21] Appl. No.: 491,765

[22] Filed: May 5, 1983

[51] Int. Cl.³ .................... G01G 23/22; G01G 19/52; G01G 19/42
[52] U.S. Cl. .......................... 177/25; 177/1; 177/50; 364/568
[58] Field of Search ................ 177/1, 25, 200, 50; 364/568

[56] References Cited

U.S. PATENT DOCUMENTS

| 3,552,511 | 1/1971 | Marcheso et al. | 177/25 |
| 3,716,706 | 2/1973 | Gray | 177/200 X |
| 4,043,412 | 8/1977 | Rock | 177/200 X |
| 4,139,070 | 2/1979 | Hanson et al. | 177/200 |
| 4,157,738 | 6/1979 | Nishiguchi et al. | 177/200 X |
| 4,219,089 | 8/1980 | Gard et al. | 177/200 X |

FOREIGN PATENT DOCUMENTS

| 142419 | 6/1981 | Japan . |
| 9227 | 3/1923 | Netherlands . |
| 2076979 | 9/1981 | United Kingdom . |

Primary Examiner—George H. Miller, Jr.
Attorney, Agent, or Firm—Parkhurst & Oliff

[57] ABSTRACT

An electronic weighing apparatus and method is disclosed which enables the counting of an unknown quantity of items or samples such as currency, coupons, coins or similar items of a nominally uniform weight. The apparatus includes an electronic scale which provides a signal representative of the weight of an unknown quantity of items, a microprocessor which stores a representative unit weight of the items being counted and calculates an item count, and a display for providing an output representing the running count or other value representative of the items being weighed. An accurate count of the items is obtained by placing items on or removing items from the scale in incremental groups such that the net weight of any incremental group of items must have a stable net weight equal to or below a predetermined threshold weight before the count is made. If any incremental group has a net weight which exceeds the threshold weight, items must be removed/added until the number of items in the group produces a net weight equal to or below the preset threshold and allows counting to continue. The apparatus automatically accumulates the total count made in a number of successive weighments by incrementing a memory device automatically when the scale weight reading returns to or below zero. The weighing apparatus may also be constructed to automatically sequence and count through a plurality of groups of different items to minimize operator intervention. The apparatus may additionally be constructed and operated to produce automatic verification of predetermined quantities of items without operator intervention.

28 Claims, 8 Drawing Figures

WEIGHING APPARATUS AND METHOD

BACKGROUND OF THE INVENTION

The present invention relates to an apparatus and method for counting and more particularly to an electronic scale apparatus and method for counting the number of an unknown quantity of items.

In the prior art, there are known a variety of devices and techniques for counting an unknown quantity of articles, samples or items. These techniques have been used in manufacturing and other processes where there is a need to quickly count a number of items which are substantially similar to one another. One of the most common techniques used in lieu of manual counting employs a weighing device to first determine the total weight of a quantity of unknown items to be counted. This total weight is then divided by a representative weight of a single item to produce a quotient which may be rounded to the nearest integer and thereby represent the total number of items. This technique has been used for counting such items as currency, coupons and coins as well as a wide variety of other articles and goods in many different arts.

As will be apparent, the accuracy of the above technique is largely determined by the uniformity in the weight of each of the items in the unknown quantity to be counted. Naturally, if each of the items is of identical weight, the total weight divided by the unit weight of the item will produce a quotient which exactly equals the total number of items in the unknown quantity. Even when each of the items does not have an identical weight, however, fairly accurate indications of item count can still be obtained so long as the items each have a nominally uniform weight. In instances where the items are not of identical weight, the total weight divided by the weight of a representative item will result in a quotient which must be rounded to the nearest integer. The part of the quotient which is deleted to produce the rounding is representative of the error in the individual item weights. As will be apparent, the more that the weight of an individual item differs from the expected weight of the item, the more likely an error will be introduced into the weighing technique resulting in an inaccurate measurement of the total count of unknown items.

Even when the items have a nominally uniform weight, the chance of an error occurring in the measurement of the total count increases as the number of items increases. Thus, if only a small number of articles are weighed using prior art techniques, the possibility of error in the calculation may be small. However, if a large quantity of items are weighed, the possibility of error increases greatly and the accuracy of the count may be further compromised by resolution errors of the weighing system itself. The problem is further compounded when individual items vary more from the nominally uniform weight than a majority of the other items thereby introducing additional inaccuracies in the total count.

In order to overcome many of the above mentioned problems, a variety of techniques have been suggested to improve the accuracy of the item count. By way of example, there are known techniques which calculate a representative unit weight based on the weight of a known quantity of items. The unit weight is then recalculated in a successive number of steps to improve its accuracy as the quantity of items is increased. The total count is then determined by dividing the total weight of an unknown quantity of items by a revised average unit weight to produce a count indicative of the unknown number of items.

In still other instances, many systems use preset unit weights which are adjusted to compensate for a variety of factors which affect the individual weights of the items being counted. Thus, a representative unit weight may be calculated based upon the actual representative weight of an item under certain conditions, and then adjusted empirically when the conditions change. Again, such techniques may approximate the total count but are still likely to produce significant errors when counting large quantities of items.

Still another technique attempts to improve count accuracy by comparing the deviation of the quotient from the nearest integer. In this instance, when the computed quotient differs from the nearest whole number by more than a predetermined amount, the calculation is considered to be in error and the count ignored. In contrast, when the computed quotient is within a predetermined deviation from the nearest whole number, the count is considered to be accurate and rounding to the nearest integer may then be performed to produce the number indicative of the actual count. Again, when counting large quantities of items, the above technique is still likely to produce error resulting in an inaccurate count of the unknown quantity of items.

The above noted problems are particularly acute when utilizing electronic scales for counting currency in the form of bank notes, coins or the like. In particular, paper currency may be subject to a variety of conditions which contribute to significant variations in the weight of individual items. Dollar bills, for example, are widely used and may be torn, taped or otherwise mutilated thereby resulting in a weight which varies widely from the unit weight of a new dollar bill. In other instances, the individual weight of such bills may change drastically due to humidity or other atmospheric conditions. Contamination or soiling of the bills may further cause their weight to vary from the expected norm. In each instance, any attempt to weigh the bills and divide by a unit weight using prior known techniques is likely to result in a highly inaccurate reading of the total count and corresponding monetary value. Accordingly, for banks and other institutions requiring rapid and accurate counting of large quantities of notes and coins, such inaccuracies limit the acceptability and usefulness of the system under many circumstances.

In addition to the above limitations, the construction and operation of prior known systems has often required significant operator involvement to obtain the requisite counting. Thus, for example, operators must perform certain functions and sequences by providing inputs to the counting system for zeroing, adding successive quantities, changing the unit of measurement and other similar tasks before the final count can be obtained. Such operator intervention increases the likelihood of error or operator induced inaccuracies and increases the time necessary to complete the counting procedure. All of this results in reduced versatility and operator acceptance of the system.

Accordingly, the present invention has been developed to overcome the shortcomings of the above known and similar techniques and to provide a counting system and technique which improves accuracy and requires less operator intervention to produce a desired count.

SUMMARY OF THE INVENTION

In accordance with the present invention, a weighing apparatus and method is disclosed which successively weighs small groups of items to provide a total count of an unknown quantity of items. The system is constructed such that the number of items for each successive (incremental) group must have a total stable net weight equal to or below a preset threshold weight before a calculation of the count can be made. When the stable net weight is equal to or below that preset threshold weight, the net weight is divided by a representative unit weight and the total count of the incremental group is added to prior group counts to provide a running total of an unknown quantity of items. When the stable net weight is greater than the preset threshold weight, items must be removed from the weighing system to lower the net weight so as to be equal to or below that threshold before a count can be made. The count of the successive incremental groups is totaled and provided as a displayed output.

In one embodiment, the system may include an electronic scale for counting currency and the like which is coupled to provide a weight signal to a microprocessor for computing the count of a quantity of items. The system is constructed so that for a given quantity of items to be counted, successive groups of items having a stable net weight less than or equal to a preset threshold weight are added to the scale platen (or scoop) and each count of the successive group is added to the prior group counts to provide the prior group counts to a running display of the total count. When the scale limit is reached and the items (or scoop) removed, the total count for that weighment is automatically stored and the count of the items may continue by again placing successive groups of items on the platen having a stable net weight equal to or below the preset threshold. In any instance where a group of items is added which has a weight exceeding the preset threshold, a number of items must be removed before the calculation of count for that group can be made and totaled with the previous counts. After each group of items is counted, the system is retared by storing the stable net weight in a subtractive tare register. As the count progresses, the monetary value or other representative value of the total number of items counted may also be displayed to show a running total during each weighment and a grand total for successive weighments. This counting technique may be similarly practiced in reverse when items are removed from the scale as long as the items are removed in incremental groups such that the stable net weight of the group removed does not exceed the preset threshold weight.

The system may be operated manually for selectively weighing groups of different items or constructed to automatically sequence through a successive number of groups of different items such as the different denominations of currency in a cash drawer. The system may also be used to verify the count of a predetermined number of items (such as the number of coins in a roll) without manually setting the scale for a particular item or denomination of coin being verified. In this instance, stored weight ranges of various rolls of different denominations are compared with the weight sensed for a selected roll to automatically determine the denomination of the roll and the number of pieces in the roll (e.g. by dividing roll weight by a stored item weight of that particular denomination). The weight ranges of various coin rolls allow this automatic detection and calculation since they differ sufficiently from one another so that the particular denominations can be identified.

It is therefore a feature of the invention to provide an improved weigh counting technique which may be simply implemented to provide improved counting accuracy.

It is another feature of the invention to provide a coin and currency counter which may be used to count currency under a variety of circumstances and conditions.

Still another feature of the invention is to provide a system and technique which counts a quantity of unknown items by weighing successive groups of items which have a stable net weight equal to or below a preset threshold weight.

Yet another feature of the invention is to provide a system and technique which successively counts groups of items by retaring the scale after each group count is calculated when the weight of the group count is equal to or below a preset threshold weight.

Yet another feature of the invention is to provide an electronic scale counting system and technique which may be used to count by adding or subtracting groups of items having a stable net weight equal to or below a predetermined threshold weight.

Still another feature of the invention is to provide a weigh counting system and technique which accumulates a total count for a number of successive weighments by automatically totalling the count for each weighment when the items are removed from the scale.

Still another feature of the invention is to provide an automatic weigh counting system and technique which automatically sequences through the count of a plurality of different groups of items for providing the total count of each group.

Yet another feature of the invention is to provide an electronic scale counting system and technique which allows automatic verification of a predetermined number of groups of items without operator intervention.

Still a further feature of the invention is to provide an automatic scale system and technique which verifies the number of coins in rolls of predetermined monetary value without opening the rolls or setting the scale for a particular denomination of coins being verified.

These and other advantages and novel features of the invention will become apparent from the following detailed description when taken with the accompanying drawings wherein:

DETAILED DESCRIPTION OF A PREFERRED EMBODIMENT

Figure 1:
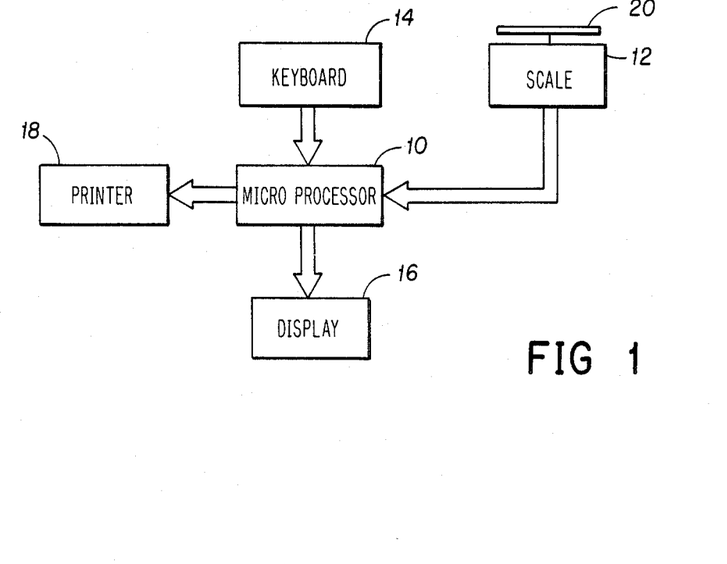
FIG. 1 is a block diagram schematically showing the weigh counting system and technique in accordance with the present invention.

Referring now to FIG. 1, there is shown a schematic block diagram of the weigh counting system of the present invention wherein like numerals are used to refer to like elements throughout. For purposes of this description, the system will be described with reference to a technique for counting wherein the items to be counted are U.S. currency (bills and coins). It will be apparent, however, that the system may be used to accurately count other items of nominally uniform weight and is therefore not restricted to the counting of bills or coins.

As shown in FIG. 1, the system includes a programmed microprocessor 10 which receives a weight signal input from a scale 12 having a weighing platen or scoop 20. Microprocessor 10 is also coupled to receive input from a keyboard 14 and provide outputs to display 16 and printer 18. The scale 12 may be of any conventional construction known in the prior art which is configured to provide a weight signal output which may be used to provide a count of items added to the platen 12 in the manner to be subsequently described. This scale 12 may include conventional circuitry for converting the weight signal into a digital value capable of being used in the computations of the microprocessor 10. Such circuitry may be any conventional analog to digital converter or other device compatible with the particular construction of the scale 12 for providing a digitized weight signal to the microprocessor 10. By way of example, the scale 12 may comprise a Wirth-Gallo type ED 60 which has its output converted by a frequency ratio detecting circuit to a digital form for use in microprocessor 10. As will be apparent, any device capable of providing a measurement of weight (or mass) could be used in lieu of a scale.

The microprocessor 10 may likewise be of any conventional construction and may be, for example, an Intel 8051 or any similar or other computer or microcomputer capable of providing the digital computations necessary for implementing the present technique. The microprocessor 10 is coupled to receive input from a keyboard 14 which may typically be twenty-one Grayhill Series 82 telephone type push buttons mounted to provide manual inputs to the microprocessor 10. Microprocessor 10 is further constructed to provide an output to drive a display 16 which may be an LCD display or any other conventional display capable of providing visual representations of the count or monetary value of the currency being counted as well as other messages as will be described in connection with FIG. 6.

The display 16 will naturally include any conventional circuitry necessary to convert the microprocessor outputs to drive the display. Such interface and driving circuits are well known in the art and need not be further described for an understanding of the present invention. The output of the microprocessor 10 may also be coupled to a printer 18 or similar device to provide a permanent record of the output of the system. In this instance, the microprocessor 10 could have an industry standard RS-232 printer output having a fixed 4800 baud rate for use with an Alphacom twenty column thermal printer as is known in the art.

Figure 2:
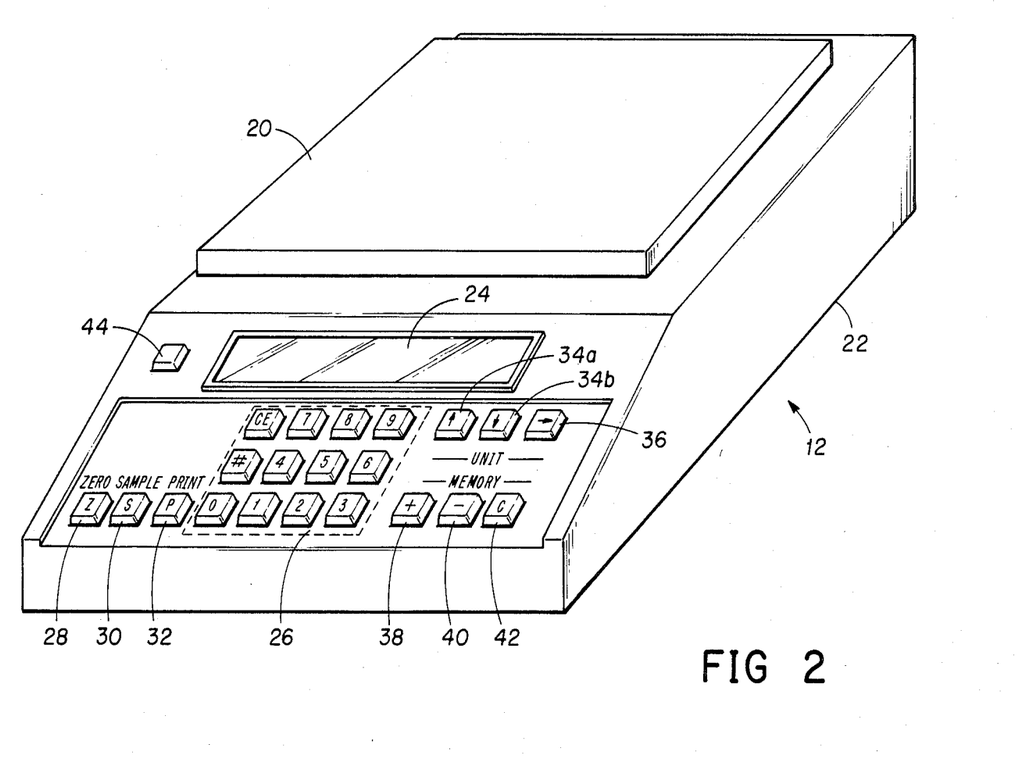
FIG. 2 is a plan view showing an exemplary configuration of an electronic scale and push button control for implementing the weigh counting system and technique of the present invention.

Referring now to FIG. 2, there is shown a more detailed illustration of an exemplary scale and weighing system configured to be structurally non-complex and compact. In this example, the scale 12 includes a housing 22 of any desirable configuration which mounts and retains the platen 20 or other conventional scoop or item receiving component for holding the items to be weighed or counted. The platen 20 is conventionally coupled to the appropriate scale mechanisms within the housing 22 to produce the signal representing the weight of any items placed on the platen 20. The microprocessor 10 may also be mounted within the housing 22 along with the conventional circuitry necessary to couple the weight signal for processing by the microprocessor 10. The keyboard 14 may likewise be mounted on a portion of the housing 22 and, in the present instance, is shown as a plurality of push button switches 26, 28, 30, 32, 34, 36, 38, 40, 42 and 44. Finally, a display 24 is mounted on another portion of the housing 22 to provide the visual output of the count or other information during use of the system.

In the present example, the keyboard 14 includes switches 26 shown as a group of 10 individual switches which are numbered 0 through 9, and two individual switches labeled CE and #. The keyboard 14 also includes switches 28, 30 and 32 labeled Z, S and P, respectively, and representing the zero, sample and print functions as will be subsequently described. Switches 34a and 34b are labeled with arrows pointing up and down respectively while switch 36 is identified with a horizontal arrow. Each of these switches are used in connection with the selection of units/denominations and the different modes of operation. Switches 38, 40 and 42 are identified by the symbols +, − and C, respectively, and are used to manually add, subtract and clear the memory register of microprocessor 10 as will be subsequently described. Switch 44 is schematically represented as a push button which may be used to control the on/off power to the weighing system.

In accordance with the present invention, the system is constructed to operate in one of several different modes which may be identified as the cash mode, roll check mode and weight mode, and which will be described in greater detail below. As was previously noted, in prior art systems, inaccurate counts may occur due to the variations of individual item weight from the unit weight used to calculate the item count. Due to multilation, humidity, tape repairs and other contamination of items such as currency, there is a greater likelihood that the weight count will be inaccurate as the number of items increases. Accordingly, the straight division of the total item weight by the approximated unit item weight will not guarantee that the currency count is accurate. Accordingly, the prior art systems are limited by the inherent inaccuracy in the weighing technique.

Pursuant to the present invention, it has been recognized that if a limited number of items are weighed in groups in successive intervals and the net weight of each group is controlled to fall equal to or below a predetermined weight threshold, a count can be made for any number of items without any error. This can be understood by reference to an example where a specific bank note is known to have a unit weight which may vary under any conditions by a maximum of plus or minus X percent. If the bank notes counted are restricted to groups such that the weight of each group does not exceed a predetermined threshold weight determined by the percent variation, the round off of the quotient produced by the weight of the group of items divided by the unit weight will always be in the direction necessary to produce an accurate count. If the count of the total quantity of notes is then made by adding the count of successive groups of notes over the weighment, the total count will always be accurate regardless of the total quantity of items being weighed.

By way of example, assume that an unknown quantity of one dollar bills is required to be weighed to determine the total count and dollar value. Next assume that the nominal weight (unit weight) of the dollar bill is one gram and it is known that that its weight under the most extreme conditions will vary by a maximum of plus or minus 4%. If the quantity is weighed by successively applying groups of 10 bills on an accurate scale, the scale will always read between 9.6 and 10.4 grams (±4% of 10 g) and in all cases round off to a reading of 10 pieces. Thus, if the net weight of bills weighed at any given time is restricted to fall equal to or below a preset threshold weight of 10 grams, the round off count for each group will always be an accurate count of the number of bills weighed.

In the present system, the preset threshold weight is fixed in accordance with the maximum variation in the unit weight for each denomination of currency to a value such that any group of bills or coins having a net weight less than the preset threshold for that denomination will always produce an accurate count. Successive groups of bills or coins are then placed on the scale and the net weight of the group (after the scale is stable) is measured to determine if it exceeds or is less than the threshold weight. If the stable net weight of the bills or coins is less than the threshold weight, that weight is divided by a stored unit weight to determine a quotient which is rounded to the nearest integer and which represents the number of the bills in the group. The system then stores the count and simultaneously retares the scale by storing the net weight of that count in a subtractive tare register of the microprocessor 10. Thereafter, another quantity of bills or coins may be added to the scale and a stable net weight produced. Again, if the stable net weight of this group is equal to or less than the preset threshold weight, the stable net weight is divided by the stored unit weight and a count is again produced which is added to the previous count to produce a running count of the total bills or coins. The scale is again retared and successive groups of bills or coins are added in a similar manner one after the other to provide a count of the total monetary value.

In the present example, the microprocessor 10 is preprogrammed to store the unit weight (individual item weight) of each denomination and the threshold weight for each denomination, and to compute th count and total monetary value of each successive group of bills or coins. As each group is counted, the count may be stored in the microprocessor 10 as a running count and converted to display a dollar value so that visual indications of the count and dollar value may be provided to the operator. In the event that a group of bills is placed on the scale which has a net weight exceeding the preset threshold, the microprocessor 10 produces an alarm signal and prevents the calculation of a count for that net weight until a sufficient number of bills or coins have been removed from that group to produce a net weight equal to or below the preset threshold. Thus, for any given unknown quantity of bills or coins, successive groups of bills or coins can be added to accurately count without error in the total number and dollar value of the bills or coins.

Alternatively, the same comparison can be made when bills are removed from the scale 12. Thus, if a predetermined number of dollar bills have been counted to produce a quantity of 150 bills on the scale and it is desired to package the bills in 50 dollar bundles, the bills may be removed and the display observed until only 100 are left on the scale 12. In this instance, however, the bills must again be removed in groups which have a stable net weight which does not exceed the preset threshold weight in order that the accurate count is maintained until a sufficient quantity has been removed. This again insures that the total number removed is accurate by restricting the total net weight of each group to a value which will always produce an accurate round off for notes having a known maximum variation from a given unit weight.

In implementing the present system, the entire weight measurement, stability determination and piece count computations can be performed many times per second using the scale 12 and microprocessor 10. Because of the response time of the system, the bills can be added to the scale in rapid cadence without disturbing the incremental nature of the counting procedure. In the particular embodiment, the microprocessor 10 is constructed to provide an output signal which may be coupled to a speaker or other audio source (not shown) to produce a specific audible tone when the stable net weight for each incremental group of bills exceeds the preset threshold thereby indicating to the operator that a number of bills must be removed (or added). Likewise, when the stable net weight is equal to or below the preset threshold and the microprocessor 10 performs the calculation of count and dollar value, the microprocessor 10 generates an output which causes another audible tone to indicate that a new incremental group of bills may be added to continue the counting. This enables the rapid manual counting of bills without interruption and inaccuracy in the counting procedure. Alternatively, a mechanical feed may be coupled to the weighing system to separate and feed the bills in bunches automatically and be controlled by the aforementioned microprocessor 10 outputs. The control could operate in a conventional manner so that when too many bills are fed, the feed is stopped until a number has been removed by the operator to reduce the stable net weight equal to or below the preset threshold as previously described.

In order to implement the above system, a digital representation of the unit weight of each denomination to be counted is stored in the program memory of the microprocessor 10. The memory (which may be an EPROM) also stores the monetary value associated with each unit weight and a value representing the threshold weight for each denomination. Whenever the microprocessor 10 detects that scale 12 receives a quantity of bills or coins which produces a stable net weight which does not exceed the threshold weight of that denomination, it converts the net weight to a piece count, multiplies it by its monetary value, increments the display by the product to display a running total and simultaneously retares the scale for the next measurement. This process is repeated for each incremental group of bills or coins added to produce the counting procedure previously described. This form of operation is known as the cash mode.

In many cases, the number of bills or coins to be counted may exceed the capacity of the particular scale used in the system. Accordingly, successive weighments may be required to obtain the toal count. In this instance, a quantity of bills or coins is counted during one weighment, the weighment removed (by removal of the money or scoop), and a second weighment or multiple weighments are made to produce the total monetary value. In prior art systems, when the scoop or money is removed from the platen to allow additional counting, it has been necessary to have the operator intercede to initiate addition of the previously weighed quantity to each successively weighed quantity. Such a requirement for operator intervention increases the likelihood that an error in the total count will be made and increases the time necessary to complete the counting. In contrast, the present invention utilizes the microprocessor 10 to sense the removal of the scoop or money from the scale to produce an indication when the weight on the scale goes to zero or below. When this happens, the total count made for that weighment is automatically stored in a memory register of the microprocessor 10 and the weighing continued. Thereafter, each time the total quantity of money or scoop is removed from the scale, the total count for that quantity is added to the memory register automatically to accumulate the grand total of the money counted in the successive weighments. This produces a grand total without the need for operator intervention in the counting process.

The same microprocessor 10 may be used to implement an alternative mode of operation which optimizes the computation of the total count and monetary value of a plurality of items such as the money that might be contained in a cash drawer. In this instance, the microprocessor 10 causes the system to automatically compute the total monetary value in the cash drawer by guiding the operator through a proper sequence of operation. By way of example, when the system is set to operate in this mode, the microprocessor 10 automatically selects and displays a first denomination and selects the associated stored weight threshold and unit weight (nickels for example). Thereafter, the operator may add nickels to the scale in groups having a stable net weight less than the predetermined threshold weight for the nickel denomination until all of the nickels have been counted. At that time, the nickels are removed and as the scale goes to zero or below due to the removal of the nickels, the microprocessor 10 increments to the next denomination such as dimes, recalls the stored threshold weight and unit weight for the dime weighing and displays the denomination. At the same time, the microprocessor 10 stores the total monetary value for the previously counted nickels in the memory register in response to the sensing of the scale weight at or below zero as described above.

Dimes are then similarly added in successive groups to continue the count and provide an indication of the total monetary value of dimes. Again, when the scoop or dimes are removed to cause the scale to produce a weight reading at or below zero, the microprocessor 10 increments to the next denomination and the total dime value is added to the memory register to provide a running total of the nickel and dime count. The next demonination may then be counted in a similar manner and each denomination thereafter automatically sequenced in a like manner until all denominations in the cash drawer have been counted. Since the incrementing of the denominations is automatic along with the associated recall of the stored threshold weight and unit weight, the calculations are made without the need for operator selection, entry or other control of the counting procedure. Obviously, the automatic sequencing can be provided for any type of item or group of items that may be stored in the microprocessor 10.

The inventive system may also be operated in still another alternative mode known as a roll check mode. In this instance, it will be recognized that for certain groups of items, such as rolls of coins, each roll will have a particular weight or range of weight for a full or substantially full or overfilled roll which differs from that of other coin rolls. As long as rolls of different denominations differ in weight (even in the case of excess or missing coins), the system can be constructed to automatically detect and display the dollar value of the roll without operator intervention. For this mode of operation, the specific weight ranges associated with each roll of a different coin type are entered into the microprocessor memory along with the unit weight for each coin type. When the roll check mode is initiated, the microprocessor 10 compares the weight of the roll with those ranges stored in its memory. If the weight falls within one of the stored ranges, the associated denomination and unit weight are used to calculate the total roll monetary value. In particular, the total weight of the roll (after subtracting an average wrapper weight) is divided by the unit weight to produce a count and that count is rounded off and multiplied by the particular monetary value of that denomination to provide a display of the monetary value of the roll. If the roll is missing or has excess coins, this can be ascertained immediately from the display 24.

In the event that the amount of excess or missing coins is such that the roll does not fall within any of the previously stored weight ranges, an error signal may be displayed which indicates that the operator must modify the roll to make it more closely approximate a normal roll. The weighing may then be performed again and the comparisons made to produce an indication of the monetary value of the roll. This again eliminates the need for significant operator intervention which may cause the entry of improper unit weights or require the entry of information by the operator which could also result in error. Each of the above modes of operation can be implemented in the microprocessor 10 of the disclosed system by programming in accordance with the prior art techniques. The programming in cooperation with the individual push button entries described below are all that is needed to produce the described system and the detailed operation.

Figure 3:
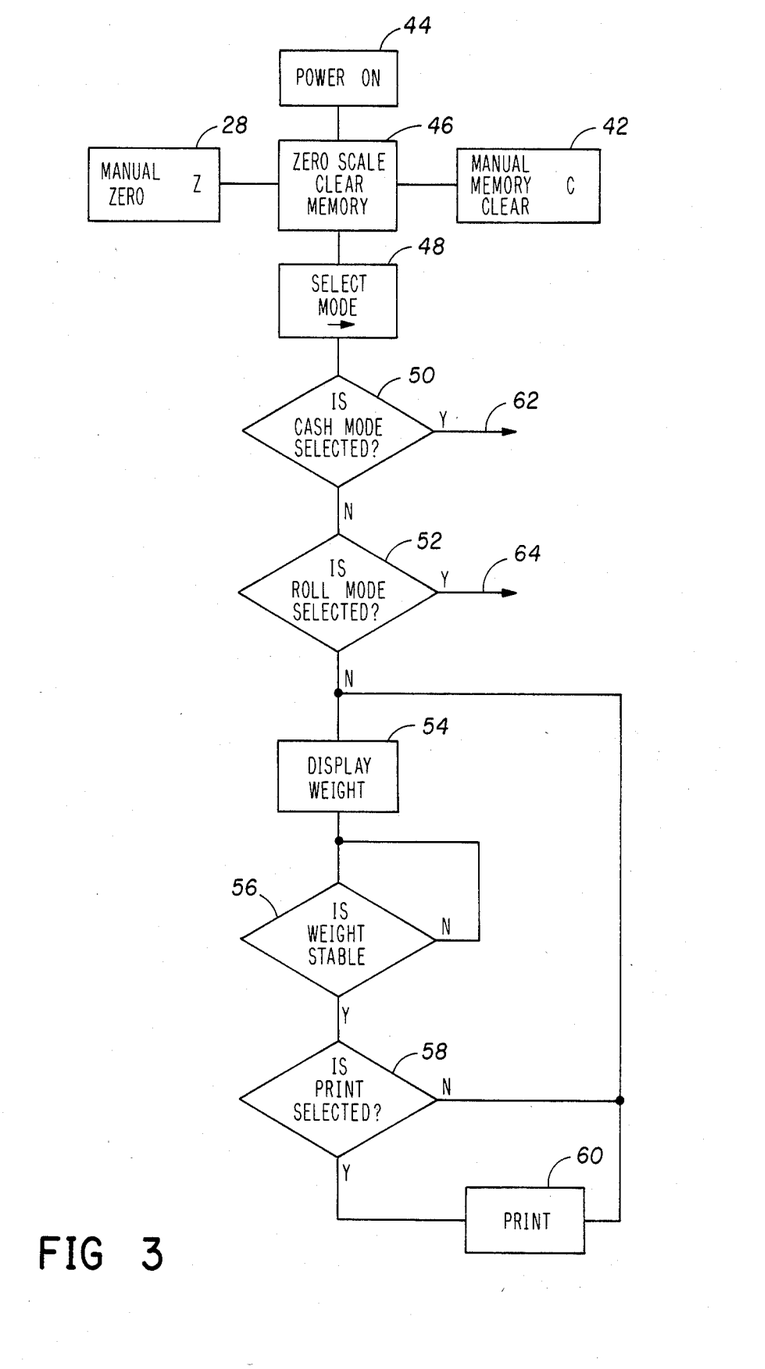
FIGS. 3, 4 and 5 are flow diagrams showing an exemplary program and operational sequence of the system of FIG. 1.
Figure 4:
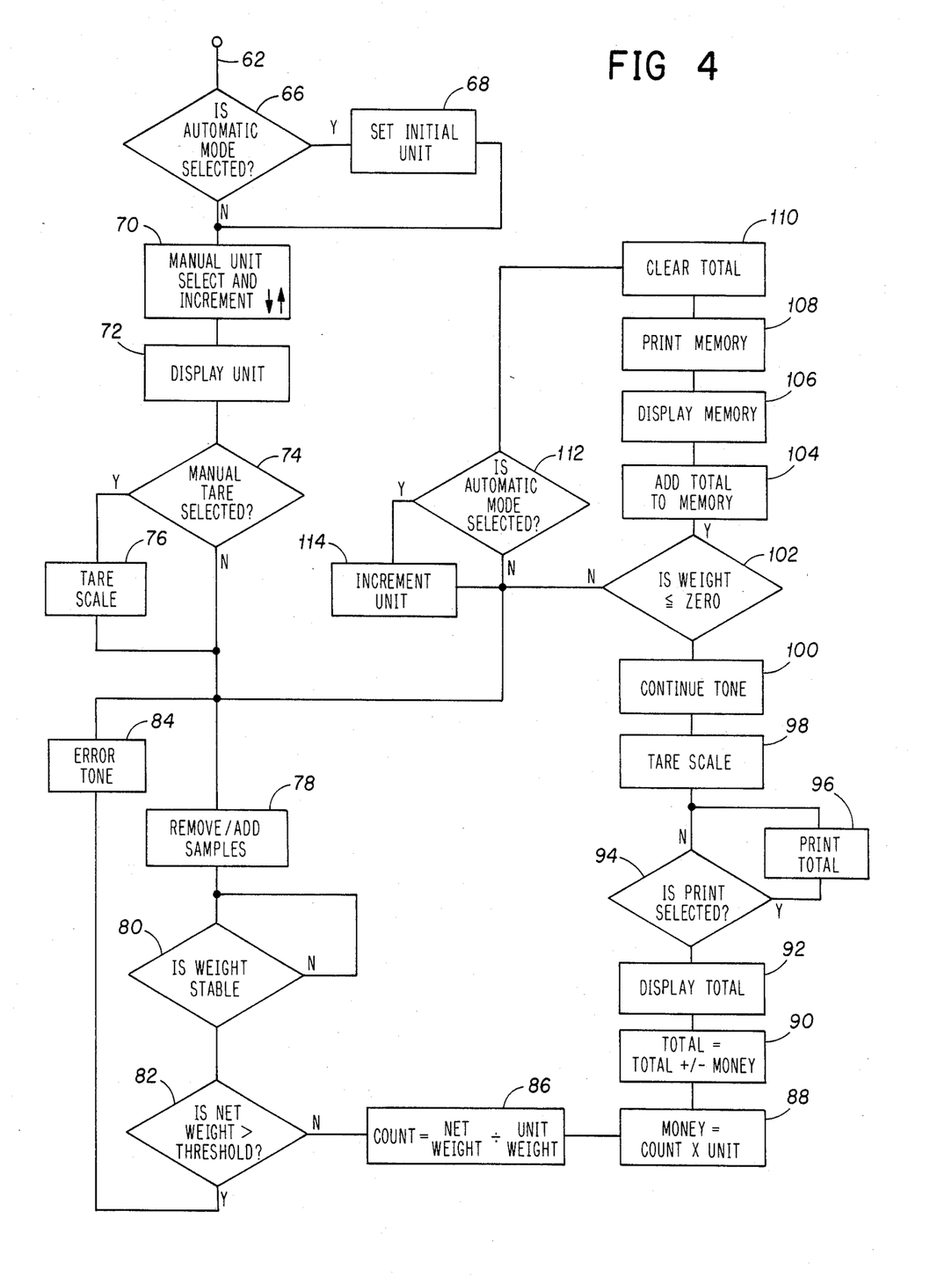
Figure 5:
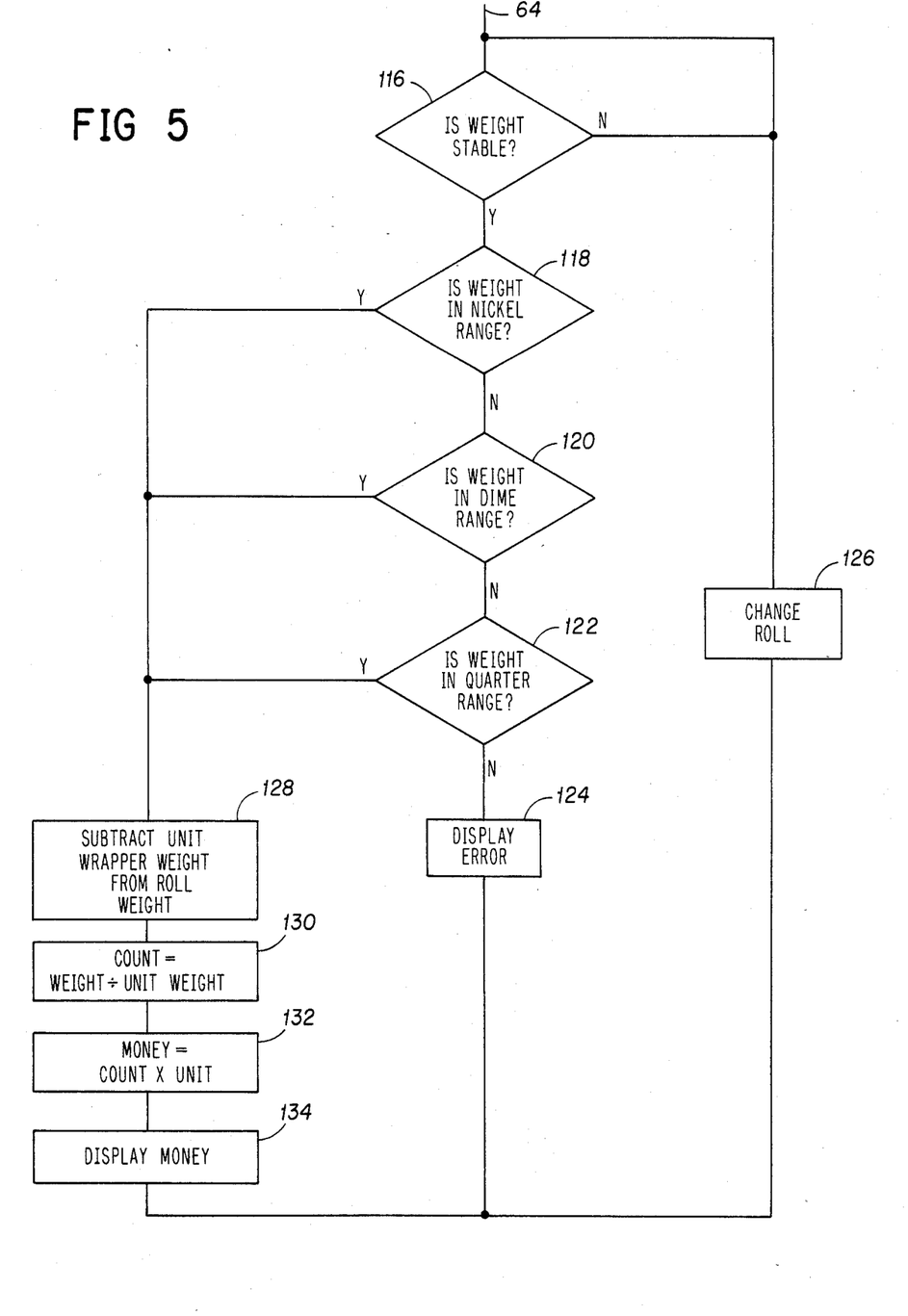

While it is believed that the above description details the operation and construction of the system, reference will now be made to the flow diagrams of FIGS. 3 through 5 representing the microprocessor programming and control, the displays of FIGS. 6a, 6b and and 6c and the keyboard buttons of FIG. 2 to further detail an exemplary operation of the system. Referring first to FIG. 3, a power may first be applied to the weighing system by means of push button 44 previously referenced with respect to FIG. 2 and schematically represented as power on at block 44 in FIG. 3. When button 44 is pushed, power is applied in a conventional manner to the weighing system of FIG. 1, and the microprocessor 10 causes the scale to zero and the memory register to be cleared. Zeroing of the scale and clearing of the memory register automatically occur at power turn on at 46 in FIG. 3 but may also be manually implemented by depressing push buttons 28 or 42, respectively, (buttons Z and C). When a load is on the scale 12 (such as the scoop) and the zero button 28 is pushed, the scale will tare and rezeroing may then be accomplished by removing the load and again pressing the zero button.

After power turn on and scale zeroing at 46, the mode of operation may be selected at 48 by repetitively pushing the scroll button 36. In the present example, the system may be operated in the cash mode, roll check mode, or weight mode each of which is selected by cycling in a conventional manner by pushing the button 36. For each depression of the button 36, the microprocessor 10 selects a different mode of operation and displays one of the three indications shown in FIGS. 6a through 6c in the upper display area 24a of the display 24. In particular, in FIG. 6a, representing the weight mode display, the word "ounces" may be selected to appear. However, the microprocessor 10 may also be programmed to cause other indications of weight such as pounds, kilograms, or otherwise depending on the calibration desired for the scale. In a similar manner, when the roll check mode is selected, the words "roll check" are displayed in upper display area 24a as shown in FIG. 6b. Again, any other message could also be displayed which would readily indicate the selection of the particular roll check mode. Finally, in FIG. 6c for the cash mode, the microprocessor 10 produces a display in area 24a including the letters GT and a dollar sign which represent the grand total monetary value counted for the successive weighments described above and as further detailed below.

In response to the selection of a mode with push button 36, the microprocessor programming determines (at 50 and 52) the mode that has been selected (and causes the display of the appropriate message in area 24a). If the cash mode has been selected, the microprocessor programming branches over line 62 to the flow diagram of FIG. 4. If the cash mode has not been selected, the microprocessor checks to determine if the roll check mode has been selected at 52. Again, if the roll check mode has been selected, the microprocessor programming branches over line 64 to the flow diagram of FIG. 5. In the event that roll check mode has likewise not been selected, the microprocessor programming recognizes that the system is in the weight mode and continues to block 54 and displays the weight of any items on the scale in the area designated as 24b in FIG. 6a. In this embodiment, although only three modes have been described, it is obvious that any number of conceivable modes could be used in currency counting or other item counting without detracting from the spirit and scope of the invention.

Figure 6A:
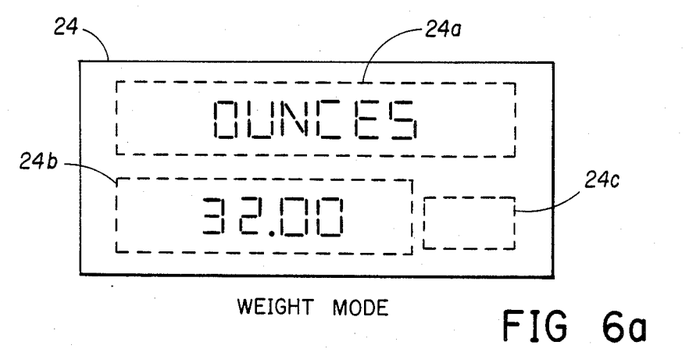
FIGS. 6a, 6b and 6c show representative display configurations that may be used in the exemplary operational modes of the system and technique of FIG. 1.
Figure 6B:
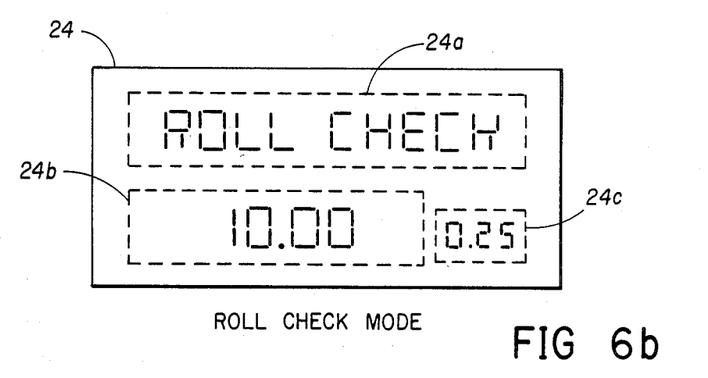

In the event that the above noted weight mode has been selected and the weight is displayed in area 24b of FIG. 6a, the microprocessor 10 checks at block 56 to determine if the weight is stable. If the weight is not stable, the microprocessor 10 continues to check the weight until it becomes stable before continuing in the program at block 56. Once the microprocessor 10 detects that the weight is stable at block 56, it then proceeds to block 58 to determine if a print function has been selected. If the print function has not been selected, the microprocessor programming branches back to block 54 and continues to display the weight. If it is desired to permanently record the displayed weight, the print function may be selected by depressing the print button 32 in which case the microprocessor programming determines at block 58 that the print has been selected and branches to block 60 to provide a signal to printer 18 to cause printing of the displayed weight and advance of the printer. Each time the print button 32 is pushed and the weight is stable, the displayed weight will again be printed by printer 18 to permanently record the weight of the items located on the scale.

In the event that the cash mode had been selected as determined by the microprocessor at block 50, the microprocessor 10 branches over line 62 to the flow diagram of FIG. 4. Thereafter, at block 66, the microprocessor 10 checks to determine if the automatic mode for producing automatic sequencing for cash drawer counting has been selected. The automatic sequencing may be selected by a particular push button or combination of push buttons at 26 or by a separate button designed specifically to initiate the automatic mode in a conventional manner. When the automatic mode has not been selected, the microprocessor programming proceeds to block 70 where the units representing the denomination to be counted are selected. More specifically, the buttons 34a and 34b of FIG. 2 are used to increment or decrement the denomination (unit). By way of example, each time button 34a is pressed, the microprocessor 10 will select a different monetary unit from the denominations 0.05, 0.10, 0.25, 0.50, 1, 5, 10, 20, 50 and 100 and will display the selected unit in area 24c of display 24 in FIG. 6c. Thus, by repetitively pushing the button 34a, the denominations will progressively increment such that any of the identified denominations may be selected and displayed in area 24c.

Likewise, by pressing button 34b, the denominations may be decremented to also select any one of the monetary units previously listed. In each case the microprocessor recognizes the selected denomination and the programming advances to block 72 to display the selected denomination. At the same time, the microprocessor recalls the stored value for unit weight and threshold weight for the selected denomination. The microprocessor programming then advances to block 74 to determine if the manual tare has been selected by depression of the zero button 28. If the zero button has been pushed, the microprocessor programming advances to block 76 and causes the scale to tare. If the manual tare is not selected (or after the manual tare has occurred), the programming advances to block 78 to begin the counting procedure.

Figure 6C:
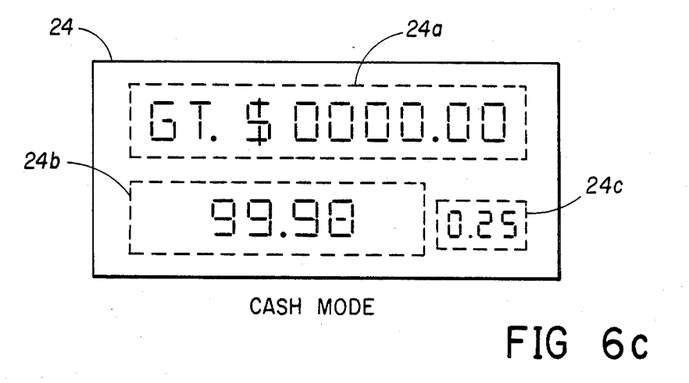

To begin counting, the operator adds individual items of the particular denomination selected at 70 by push buttons 34a or 34b and as displayed at 24c in FIG. 6c. It should be recalled, that when the units are selected at 70, the microprocessor 10 recognizes the denomination (unit) selected and recalls the associated preprogrammed unit weight and threshold weight for that unit. Accordingly, after samples have been added at 78, the programming proceeds to block 80 and the scale is scanned by the microprocessor 10 to determine if the scale weight is stable. After the weight stabilizes, the microprocessor 10 makes a comparison of the net weight of the added group of items to determine if the net weight is greater than the threshold associated with the denomination selected. If the net weight is greater than the threshold for the denomination selected, the microprocessor programming proceeds to block 84 and produces a signal generating an error tone which may be a high frequency tone indicating to the operator that he must remove a number of items (samples) from the scale. After removal of the items, the microprocessor 10 again checks to determine if the weight is stable and the net weight is equal to or less than the threshold as described above.

So long as the net weight exceeds the threshold, the error tone will continue and the operator must continue to remove samples. When, however, the net weight is equal to or less than the threshold, the microprocessor 10 branches to block 86 and divides the net weight by the unit weight of the selected denomination to produce a count which is rounded off to the nearest integer. Thereafter the programming advances to block 88 where the monetary value of the count is determined by multiplying the count times the selected denomination. The programming then advances to block 90 and a total is calculated such that the total is equal to the previously stored total plus or minus the present value of the money calculation at 88. The value of the money calculation is added to the total at 88 when successive groups of items are being added to the scale and is subtracted from the total at 88 when successive groups of items are being removed from the scale.

Thereafter, the process continues to block 92 and the running total is displayed while the microprocessor 10 checks at block 94 to determine if the operator has selected the print function. If the print function has been selected, the microprocessor 10 advances to block 96 and produces a signal which causes the printer to print the total and continue in the flow diagram. Following the print, or if the print is not selected, the microprocessor 10 advances to block 98 and causes the scale to automatically tare so that the stable net weight is stored in a subtractive tare register and subsequently used to determine the net weight of subsequent groups of items.

Once the scale is retared at 98, the microprocessor advances to block 100 and causes the generation of a second tone of lower frequency than the error tone at 84 to indicate to the operator that additional items may be added to the scale. At this time, the microprocessor 10 checks at block 102 to determine if the weight on the scale is less than or equal to zero (money or scoop removed). If the weight is not less than or equal to zero, the microprocessor branches to block 78 and again performs the calculations for determining net weight and total money for stable net weight as the operator continues to add (or remove) samples. Each time a group of samples is weighed, counted and totaled, the total at 90 is updated by the microprocessor to produce a running count of the total on the scale 12 at that time. Likewise, if money is removed, the same total will be decremented by the amount of money removed to continuously produce a displayed total in area 24b of FIG. 6c representing the monetary value of the money on the scale 12 at that time.

In the event that the range of the scale 12 is insufficient to count all of the given quantity of samples in one weighment, the money (and/or scoop) may be removed from the scale to allow for further counting. When this happens, the microprocessor at 102 senses that the weight on the scale has returned to or below zero. The microprocessor then branches to 104 and stores the total in a memory register, continues to 106 and displays the memory register contents in area 24a adjacent the dollar sign (to produce a grand total of the money counted to that time), and continues to block 108 to print that amount. Thereafter, the programming continues to block 110 to clear the total.

The microprocessor 10 then checks at block 112 to determine if the system is in the previously mentioned automatic mode. If it is not, the microprocessor 10 branches to 78 and the operator may again start counting samples. When this occurs, the programming and microprocessor operation continue as described above until the limits of the scale have been reached and the money is again removed and the memory register totaled to allow a further continuation of the counting. This process continues until all items in the unknown quantity have been counted and totaled.

In the event that the automatic sequencing mode has been selected, the microprocessor 10 at block 66 branches to block 68 to select the initial denomination (and recall the threshold weight and unit weight for that denomination) before proceeding with the described operation at block 70. The microprocessor 10 may be programmed to begin the sequencing at any denomination although normally the sequencing would start at the lowest denomination and increment to the highest. Thereafter, the operation continues as previously described by repetitively placing groups of the coins or bills of the denomination shown at 24c of FIG. 6c on the scale 12.

In this mode of operation, removal of the scoop or money from the scale causes the microprocessor 10 to branch at 102 as was previously described. However, at 112, the microprocessor detects that the system is in the automatic sequence mode and advances to block 114 where it automatically increments the units at 144 to progress to the next denomination in the sequence. Thus, each time the scoop or quantity of money is removed from the scale to produce a weight which is less than or equal to zero, the microprocessor 10 causes an increment in the denomination displayed at 24c for the next weighment and produces a grand total display at 24a in the same manner as was previously described with respect to the normal cash mode. Only one scoop of each denomination may be counted without manual intervention since the denomination is automatically incremented each time the scoop or quantity of money is removed.

Returning again to FIG. 3, if the previously described cash mode was not selected at 50, and the roll mode was selected as determined by the microprocessor at 52, the microprocessor 10 branches over line 64 to the diagram of FIG. 5. In this case, the microprocessor 10 ignores any selection of units that has been made by the buttons 34a and 34b and initially does not provide an output in the area 24c. However, when a roll of coins is added to the platen 20 (or scoop) of the scale 12, the microprocessor 10 first scans the weight signal at block 116 to determine when the weight becomes stable. After the weight becomes stable, the microprocessor 10 compares the weight of the roll with the stored preprogrammed weight ranges of, for example, a nickel roll, a dime roll, and a quarter roll, at blocks 118, 120 and 122 in the flow diagram. In the event that the roll weight does not fall within any of those weight ranges, microprocessor 10 causes the generation of a signal at 124 which may be used to provide an error message in display area 24b of FIG. 6b. At this time, the operator must modify the number of coins in the roll or change the roll at 126 before the operation can be continued.

If the microprocessor determines at 118, 120 or 122 that the roll is within one of those weight ranges, the microprocessor automatically displays the roll denomination at 24c, selects a stored preprogrammed wrapper weight representing the average weight of the wrapper for that roll and automatically selects the stored preprogrammed unit weight representing the average weight of each coin in that roll. The microprocessor at 128 then subtracts the average wrapper weight from the scale weight to produce a net weight of the coins in the selected roll. Thereafter, the microprocessor advances to block 130 and calculates a count of the coins in the roll by dividing the net roll weight by the unit weight of that denomination and rounding off to the nearest integer. The monetary value is then calculated at 132 by multiplying that count by the unit denomination recalled by the microprocessor 10 to produce a display in area 24b as an indication of the monetary value of the roll. If the roll contains missing or excess coins, (as indicated by the total dollar amount in the display area 24b) such that the displayed dollar value differs from the expected dollar amount for a full roll, the operator may add or subtract coins equal to that amount and then recheck to verify the roll by again placing it on the scale at 126.

In addition to the above described features, the system may include other modes of operation known in the prior art. By way of example, the keyboard numbers 0-9 and the plus and minus buttons 38 and 40 may be used to increment or decrement the memory register in a manner similar to an adding machine and systems of the prior art. In this context, the CE button may be used to clear entries prior to incrementing or decrementing of the memory register and the # button may be used to provide special functions such as entering two zeros to speed up the entry of even dollar amounts.

The weighing system may also be operated in a count mode similar to conventional systems by depression of the sample button 30. In this instance, the scale 12 and microprocessor 10 detect the individual (unit) weight of a known predetermined number of samples and then calculate the total count of an unknown quantity based on that unit weight. It should also be noted that although the printing and weight mode functions have been described with respect to the inventive system, the same may be optional if so desired. Thus the system may contain only one or many modes of operation thereby producing a versatile yet accurate device.

While the invention has been described with reference to specific items such as currency, the use of a microprocessor for providing the computation and control, and specific configurations of keyboard and displays, it is apparent that other items could be counted and other elements used for computation, information entry and display. The function of the microprocessor 10 could be implemented with discrete logic elements if so desired or by any other equivalent structure capable of performing the functions described above. Likewise, the particular scale and display elements could be any which provide the requisite weight (or mass) measurements and visual indications necessary to allow operator determination of item count and monetary values. Further, although the particular unit weights associated with the individual items and the particular ranges for threshold weights and coin rolls have been described as preprogrammed into the microprocessor 10, it is apparent that the same could be manually entered through the keyboard 14 or stored in any other manner with appropriate programming procedures. Accordingly, many other modifications and variations are possible in light of the above teachings. It is therefore to be understood that within the scope of the appended claims, the invention may be practiced otherwise than as specifically described.

What is claimed is:

1. A weighing apparatus for measuring a quantity of items of nominally uniform weight comprising:
   means associated with the apparatus for receiving items of nominally uniform weight to be counted and for providing an output of the weight of such items;
   means for detecting said weight to determine a change in a number of said items;
   means for detecting the weight of the number of items changed and comparing that weight with a preset threshold weight; and
   means for computing a count of the number of items changed for each weight less than or equal to said preset threshold.

2. The apparatus of claim 1 wherein said means for detecting weight detects a change in the weight due to the addition of groups of at least one item and further including means for providing a total count for successive additions of groups of at least one item having a weight less than or equal to said preset threshold.

3. The apparatus of claim 1 wherein said means for detecting weight detects a change due to the removal of groups of at least one item and further including means for providing a total count of said groups of at least one removed item having a weight less than or equal to said preset threshold.

4. A scale for measuring the number or value of an unknown quantity of items of nominally uniform weight comprising:
   means for receiving successive groups of items from an unknown quantity of items of nominally uniform weight and providing an output proportional to the weight of each group;
   means for comparing each output to a preset threshold weight;
   means responsive to each output being less than or equal to said preset threshold weight for computing a count of the items in each group; and
   means for successively adding the counts computed for each group to provide a total count of the unknown quantity of items.

5. The scale of claim 4 further comprising means for displaying the count as a number or value of said unknown quantity of items.

6. The scale of claim 4 wherein said means for receiving and providing an output provides a signal representative of mass.

7. The scale of claim 4 wherein said means for computing comprises means for retaring the scale after each computation of group count so that each successive output of a group weight represents a net weight of the group of items.

8. The scale of claim 4 further including means for determining when the output of each successive group of items is stable.

9. The scale of claim 4 further comprising means responsive to said means for comparing for inhibiting the computation of a group count when an output exceeds said preset threshold value.

10. The scale of claim 4 further including means responsive to said scale for detecting when the weight on said scale becomes less than or equal to zero and means for summing the total count of the groups of items weighed for each successive return of the weight on the scale to zero or below.

11. The scale of claim 4 wherein said means for comparing, computing and adding comprises a microprocessor.

12. The scale of claim 11 wherein said microprocessor is constructed to store a representative weight of a single item for each type of item to be counted.

13. The scale of claim 12 wherein said microprocessor is constructed to store a weight as said preset threshold value for each type of item to be counted and to compute the count for each group by dividing the weight of each group by the representative weight of a single item of that group and rounding to the nearest integer.

14. A scale for automatically counting groups of unknown quantities of items of nominally uniform weight comprising:
   means for receiving a group of an unknown quantity of items of nominally uniform weight and providing a signal proportional to the weight of said group;
   means for storing a plurality of ranges proportional to weight with each range associated with a different item type;
   means responsive to said means for receiving for detecting said signal to determine if the detected signal falls within one of said ranges; and
   means responsive to said signal falling within one of said ranges for calculating a count of the total number of items in said group for the type of item associated with said one range.

15. The scale of claim 14 further comprising means for displaying an indication of the type of item for the items in the group associated with said one range.

16. The scale of claim 14 further comprising means for providing an indication of error when said detected signal falls outside all of said ranges.

17. The scale of claim 14 wherein said means for receiving is a scale which receives a coin roll forming said group of items and further wherein said means for storing stores weight ranges representing predetermined dollar amounts for each roll of coins.

18. The scale of claim 17 further comprising means for computing a monetary value from the count of the coins in each roll.

19. An electronic scale for providing automatic sequencing for counting different types of items, wherein items of the same type have nominally uniform weights, comprising:
   means for receiving successive groups of items and providing an output proportional to the weight of each group received and an output less than or equal to a predetermined weight when no items are received;
   means for storing a plurality of unit weights each representing the weight of a different type of item;
   means responsive to said means for receiving and said means for storing for selecting one of said unit weights and for providing a count of each group of similar items by dividing said output by said selected one of said unit weights and rounding to the nearest integer;
   means for successively adding each count; and
   means responsive to said output being less than or equal to said predetermined weight for automatically causing said responsive means to select a different one of said unit weights.

20. The scale of claim 19 wherein said groups of items are different denominations of currency.

21. The scale of claim 19 wherein said means for providing comprises means responsive to a detection of the weight of each group to determine if said group has a weight greater than a preset threshold weight, and means responsive to said weight having a weight greater than said threshold weight for inhibiting the count of said group.

22. A method for measuring the number or value of an unknonwn quantity of items of nominally uniform weight comprising:
   placing successive groups of items of nominally uniform weight on a scale to provide an indication of the net weight of each successive group of items;
   comparing the net weight of each successive group of items with a predetermined threshold weight;
   calculating the count of the items in each successive group by dividing the net weight by a unit weight and rounding to the nearest integer only when the net weight of the group is less than or equal to said predetermined threshold; and
   successively adding the count of each group to provide an indication of the total count of the unknown quantity.

23. The technique of claim 22 further comprising the step of providing an indication of error when the net weight exceeds said threshold weight.

24. The technique of claim 22 further comprising the step of retaring the scale automatically after each calculation of count.

25. A scale for measuring a quantity of items having the ability to operate in at least three different modes, comprising:
   (a) first means for measuring a quantity of items in a first mode, the first means further comprising:
      means for receiving items of nominally uniform weight to be counted and for providing an output of the weight of such items;
      means for detecting said weight to determine a change in a number of said items;
      means for detecting the weight of the number of items changed and comparing that weight with a preset threshold weight; and
      means for computing a count of the number of items changed for each weight less than or equal to said preset threshold;
   (b) second means for measuring groups of unknown quantities of items in a second mode, the second means further comprising:
      means for receiving a group of an unknown quantity of items of nominally uniform weight and providing a signal correlatable to the weight of said group;
      means for storing a plurality of ranges correlatable to weight with each range associated with a different item type;
      means responsive to said means for receiving for detecting said signal to determine if the detected signal falls within one of said ranges; and
      means responsive to said signal falling within one of said ranges, for calculating the total number of items in said group for the type of item associated with said one range; and
   (c) third means for providing sequencing for counting different type of items in a third mode, wherein items of the same type have nominally uniform weights, said third means further comprising:
      means for receiving successive groups of items and providing an output correlatable to the weight of each group received;

means for storing a plurality of unit weights each representing the weight of a different type of item;

means responsive to said means for receiving and said means for storing for selecting one of said unit weights and for providing a count of each group of similar items; and means for adding each count.

26. An electronic scale for automatically measuring a quantity of items having the ability to operate in at least three separate modes, comprising:

(a) first means for measuring a quantity of items in a first mode, the first means further comprising:

means for receiving successive groups of items of nominally uniform weight from an unknown quantity of items and providing an output proportional to the weight of each group;

means for comparing each output to a preset threshold value;

means responsive to each output being less than or equal to said preset threshold value for computing a count of the items in each group; and means for successively adding the counts computed for each group to provide a total count of the unknown quantity of items;

(b) second means for automatically measuring groups of unknown quantities of items in a second mode, said second means further comprising:

means for receiving a group of an unknown quantity of items of nominally uniform weight and providing a signal proportional to the weight of said group;

means for storing a plurality of ranges proportional to weight with each range associated with a different item type;

means responsive to said means for receiving for detecting said signal to determine if the detected signal falls within one of said ranges; and means responsive to said signal falling within one of said ranges for calculating the total number of items in said group for the type of item associated with said one range; and (c) third means for providing automatic sequencing for counting different types of items in a third mode, wherein items of the same type have nominally uniform weights, said third means further comprising:

means for receiving successive groups of items and providing an output proportional to the weight of each group received and an output less than or equal to a predetermined weight when no items are received;

means for storing a plurality of unit weights each representing the weight of a different type of item;

means responsive to said means for receiving and said means for storing for selecting one of said unit weights and for providing a count of each group of similar items by dividing said output by said selected one of said unit weights and rounding to the nearest integer;

means for successively adding each count; and means responsive to said output being less than or equal to said predetermined weight for automatically causing said respective means to select a different one of said unit weights.

27. A scale for counting currency comprising an unknown quantity of currency items of nominally uniform weight comprising:

means for receiving successive groups of currency items of nominally uniform weight from an unknown quantity of currency items and providing an output proportional to the weight of each group;

means for comparing each output to a preset threshold weight;

means responsive to each output being less than or equal to said preset threshold weight for computing a count of the items in each group;

means for successively adding the counts computed for each group to provide a total count of the groups;

means responsive to the weight on said scale for detecting when the weight on said scale becomes less than or equal to zero; and means for automatically summing the total count of the groups of currency items weighed for each successive return of the weight on the scale to zero or below.

28. A scale for automatically counting rolls of unknown quantities of coins having nominally uniform weight comprising:

means for receiving a roll of an unknown quantity of coins and providing a signal proportional to the weight of said roll;

means for storing a plurality of ranges proportional to weight with each range representing predetermined dollar amounts associated with a different coin type;

means responsive to said means for receiving for detecting said signal to determine whether the detected signal falls within one of said ranges; and means responsive to said signal falling within one of said ranges for calculating a count of a total number of coins in said group for the type of coin associated with said one range.

* * * * *